United States Patent
Margaliot et al.

(10) Patent No.: US 6,572,274 B1
(45) Date of Patent: Jun. 3, 2003

(54) SAFETY SHUTTER MODULE FOR FIBER-OPTICS CONNECTOR

(75) Inventors: Barak Margaliot, Revava (IL); Gil Levi, Moshav Hagor (IL)

(73) Assignee: Lynx Photonic Networks Inc., Calabasas Hills, CA (US)

( * ) Notice: Subject to any disclaimer, the term of this patent is extended or adjusted under 35 U.S.C. 154(b) by 0 days.

(21) Appl. No.: 09/997,295

(22) Filed: Nov. 29, 2001

(51) Int. Cl.$^7$ ................................................ G02B 6/38
(52) U.S. Cl. ........................................ 385/75; 439/138
(58) Field of Search ............................ 385/75, 19, 69, 385/70, 71, 72, 73, 53, 77, 78; 439/138

(56) References Cited

U.S. PATENT DOCUMENTS

| | | | |
|---|---|---|---|
| 4,767,179 A | | 8/1988 | Sampson et al. .......... 350/96.2 |
| 5,506,922 A | * | 4/1996 | Grois et al. .................. 385/75 |
| 5,687,268 A | | 11/1997 | Stephenson et al. .......... 385/73 |
| 5,708,745 A | | 1/1998 | Yamaji et al. ................ 385/92 |
| 5,956,444 A | * | 9/1999 | Duda et al. ................... 385/53 |
| 6,076,973 A | * | 6/2000 | Lu ................................ 385/60 |
| 6,206,577 B1 | | 3/2001 | Hall, III et al. ................ 385/53 |
| 6,296,398 B1 | | 10/2001 | Lu ................................ 385/60 |
| 6,299,398 B1 | | 10/2001 | Shinjo .......................... 411/43 |
| 6,302,592 B1 | | 10/2001 | Zullig .......................... 385/60 |

* cited by examiner

*Primary Examiner*—Javaid Nasri
(74) *Attorney, Agent, or Firm*—Ladas & Parry

(57) ABSTRACT

A safety shutter module adapted to fit onto a standard fiber-optics connector which terminates a transmission line conveying light signals of high intensity to be received by an adapter when it is coupled to the connector. When decoupled, these light signals leak from the front end of the connector and are radiated therefrom. This radiation is hazardous to the eyes of individuals exposed thereto. The module is composed of a cap that fits onto the connector and is provided with a visor that projects beyond the front end, the visor having a hinged shutter plate that depends therefrom to block the radiation. But when the adapter is plugged into the connector, it then acts to swing the shutter plate upwardly against the visor to admit the adapter and unblock the connector.

22 Claims, 2 Drawing Sheets

SAFETY SHUTTER MODULE FOR FIBER-OPTICS CONNECTOR

BACKGROUND OF THE INVENTION

1. Field of the Invention

This invention relates generally to safety shutters which act to block hazardous high-intensity light signals radiated from a connector terminating the transmission line conveying these signals when the connector is decoupled from an adapter for receiving these signals, thereby shielding the eyes of individuals exposed to this radiation.

More particularly, the invention resides in to a shutter module which fits onto a standard fiber-optics connector and is adapted to block radiation therefrom only when the connector is decoupled from the adaptor.

2. Status of Prior Art

Fiber-optics transmission systems are widely used to convey data, voice video and other modulated light signals of high intensity such as laser beam signals. The concern of the present invention is with the connector terminating a fiber-optics transmission line conveying high-intensity light signals to be received by an adapter coupled to the connector. The adapter which feeds the signals to a terminal unit centers the fibers to minimize insertion losses.

When it becomes necessary to repair or make changes in the system and to do so, one must decouple the adapter from the fiber-optics transmission line connector, it is usually not feasible to interrupt and switch off light signal transmission. As a consequence, the open front end of the connector is exposed to dirt, dust and other contaminants. And it also leaks into the atmosphere the high-intensity light rays.

To avoid contamination of the decoupled connector, it is known to cover it with a dust cover such as the cover disclosed in U.S. Pat. No. 6,299,398 (2002) to Lu. The Lu cover is attached to the connector when the connector is not in use and its front end is then exposed.

The more serious problem encountered with a decoupled fiber-optics connector is not contamination which is not a factor unless the connector is decoupled for a prolonged period, but the high-intensity light rays leaking from the front end of the connector the moment it is decoupled. Individuals in the proximity of the radiating connector run the risk of damage to their eyes, even to the point of blindness. This risk is comparable to that experienced when looking directly at the sun.

The prior art fully recognizes the safety hazards which arise when a "live" fiber-optics connector is decoupled so that it then radiates high-intensity light signals. And the prior art discloses various ways of coping with this unsafe condition. Thus U.S. Pat. No. 5,687,268 to Stephenson et al. discloses a safety shutter pivoted on a device associated with a fiber-optics connector which when swung down then blocks light rays radiating from the connector.

The 1998 U.S. Pat. No. 5,708,745 to Yamaji discloses laser beam rays radiated from a fiber-optics connector which are blocked by a pair of shield plates hinged to a casing surrounding the connector. These plates are swung out of the way when an adapter enters the doors to be coupled to the connector. Showing a similar arrangement is U.S. Pat. No. 6,206,577 (2001) to Hall et al. in which a pair of shutter doors prevents laser beams leakage from a fiber-optics connector.

Various other types of safety shutters for fiber-optics connectors are disclosed in the following U.S. patents:

1) U.S. Pat. No. 6,296,398 (2001) to Lu
2) U.S. Pat. No. 4,767,179 (1988) to Sampson et al.
3) U.S. Pat. No. 6,302,592 (2001) to Zullig

SUMMARY OF THE INVENTION

In view of the foregoing, the main object of this invention is to provide a self-sufficient, safety shutter module adapted to fit onto a fiber-optics connector to block radiation emanating from the connector of high-intensity light signals only when the connector is decoupled from an adapter or other device for receiving these signals.

More particularly, an object of this invention is to provide a cap-like module that fits onto a standard connector terminating a "live" fiber-optics transmission line, the attachment of the module to the connector requiring no screws of similar fasteners.

Among the significant advantages of a module in accordance with the invention are the following:

A. The module is a unitary structure in which all components of the module are integrated.
B. The module can be tailored to conform to any existing type of fiber-optics connector and therefore does not require a specially-made connector.
C. The module requires no maintenance and can be mass-produced at relatively low cost.

Briefly stated, these objects are attained in a safety shutter module adapted to fit onto a standard fiber-optics connector which terminates a transmission line conveying light signals of high intensity to be received by an adapter when it is coupled to the connector. When decoupled, these light signals leak from the open front end of the connector and are radiated therefrom. This radiation is hazardous to the eyes of individuals exposed thereto.

The module is composed of a cap that fits onto the connector and is provided with a visor that projects beyond the front end, the visor having a hinged shutter plate that depends therefrom to block the radiation. But when the adapter is plugged into the connector, it acts to swing the shutter plate upwardly against the visor to admit the adapter and unblock the connector.

BRIEF DESCRIPTION OF THE DRAWINGS

For a better understanding of the invention as well as other objects and features thereof, reference is made to the annexed drawings in which.

DETAILED DESCRIPTION OF THE INVENTION

Figure 1:
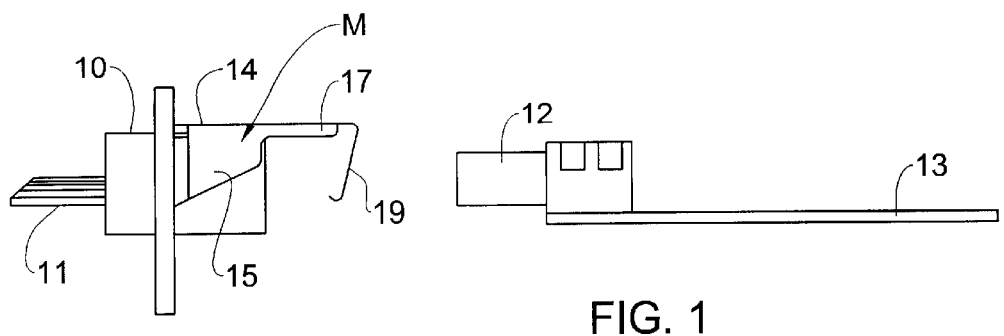
FIG. 1 schematically shows a safety shutter module in accordance with the invention fitted onto a fiber-optics connector, and an adapter which is to be plugged into the connector.
Figure 2:
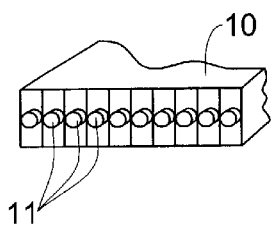
FIG. 2 illustrates the open front end of the connector when decoupled from the adapter.

Referring now to FIGS. 1 and 2, shown therein is a fiber-optics connector 10 terminating a cable having multiple fiber-optics transmission lines, each conveying a modulated high-intensity light signal. These signals are received by an adapter 12 when it is plugged into the connector. The adapter then feeds these signals to a terminal unit 13.

The concern of the present invention is the condition which prevails when connector 10 is decoupled from adapter 12 and the fiber optic lines 11 terminated at the front end of connector 10 are exposed, as shown in FIG. 2. The resultant leakage of the light signals and the radiation of high-intensity light rays from the open front end of the connector is hazardous to the eyes of any individual, such as a repairman then in the proximity to the decoupled connector.

The purpose of a safety shutter module M in accordance with the invention which fits onto the connector is to block this hazardous radiation and thereby shield the eyes of individuals exposed thereto when the connector is decoupled.

Connector 10 has a box-like configuration; hence, rectangular cross-section. In order for module M to fit nearly on the connector it must have a conforming geometry. To this end, module M has a cap-like structure defined by a planar rectangular top wall 14, on either side of which is a pair of ears 15 and 16, the top wall resting on the top surface of the connector, the ears lying against opposite sides thereof. At right angles to the rear end of top wall 14 is a back plate 20.

Projecting forwardly from the top wall 14 of the cap beyond the front end of the connector is a visor 17. Depending from visor 17 at right angles thereto is a rectangular shutter plane 19. It is joined to the top wall by a set of three living hinges 18a, 18b, and 18c such that the shutter plate can be swung from its operative mode vertical position as shown in FIG. 1 in which it blocks the radiation of light rays from the front end of the decoupled connector to an inoperative mode position shown in FIG. 3 in which it lies horizontally against the undersurface of visor 17.

Module M can be injection molded of a high-strength, resilient synthetic plastic material such as polycarbonate or polyethylene so that all components thereof are integrated into a unitary structure capable of surviving repeated operative mode and inoperative mode operations during which the hinges are flexed.

Figure 3:
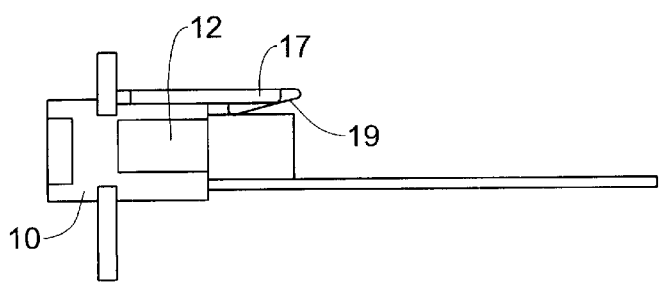
FIG. 3 shows the adapter plugged into the connector.
Figure 4:
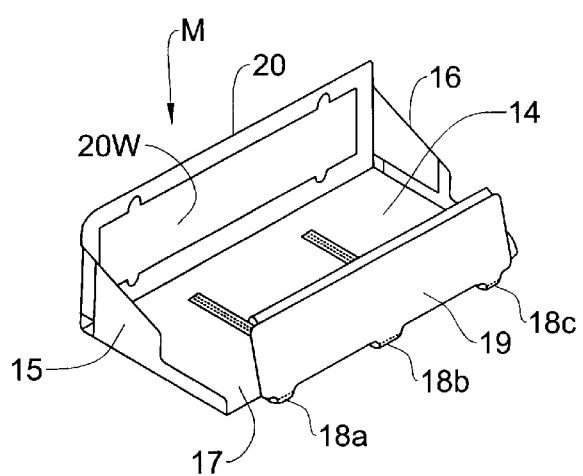
FIG. 4 is a flat of the module when upside down.
Figure 5:
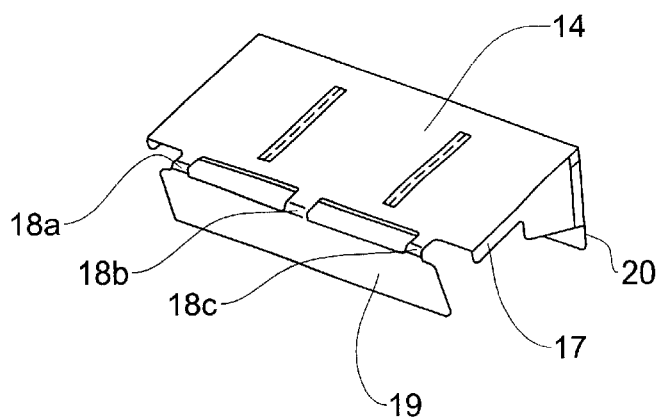
FIG. 5 is a perspective view of the shutter component of the module.
Figure 6:
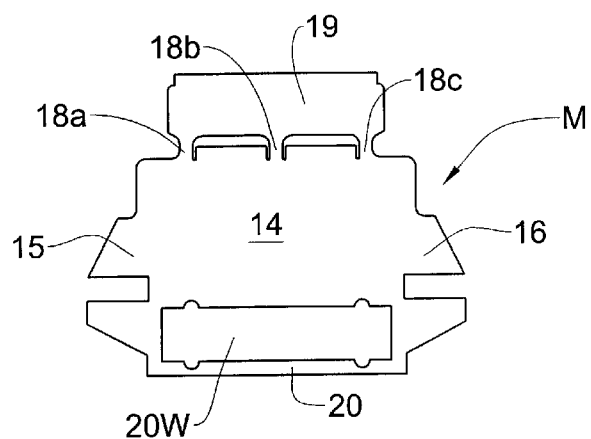
FIG. 6 shows the relationship between a bipartite connector and the rear section of the module.
Figure 7:
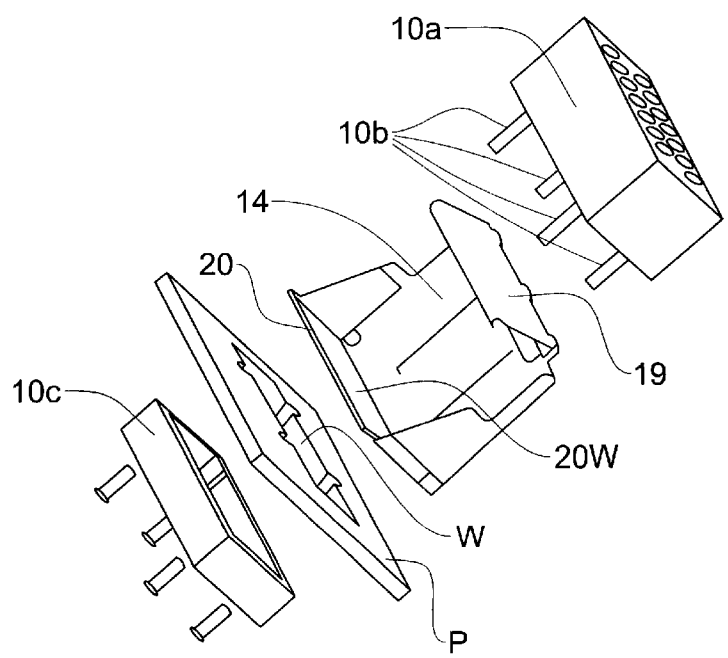
FIG. 7 schematically shows an exploded view of a safety shutter module in accordance with a preferred embodiment of the invention.

When adapter 12 is plugged into connector 10, the ends of the fibers in the connector are then in registration with those in the adapter leading to a terminal unit and feeding the light signals thereto. This plug-in action intercepts the hinged shutter plate 19 and swings it upwardly against the underside of visor 17, as shown in FIG. 3 to unblock the connector and admit the adapter.

A preferred method for fabricating module M is by die-cutting or stamping a sheet of resilient metal such as spring steel or beryllium copper having spring characteristic.

When thereafter the adapter is withdrawn from the connector, shutter plate 19 then reverts to its operative mode as shown in FIG. 1 to block radiation from the open front end of the connector. Because no fasteners are required to affix the module to the connector it is a simple matter to fit the module onto the connector and to later remove it therefrom.

Essential to a module in accordance with the invention is that it can be tailored to fit onto and conform to a standard fiber-optics connector. In a preferred embodiment of a fiber-optics module, it is adapted to fit onto a standard bipartite connector, as shown in FIGS. 2 through 7, having a block-like front part 10a, joined to a rear part 10c by a set of four corner pins 10b projecting from the rear end of the front part 10a and socketed in bores adjacent to the corners of the rear part 10c.

Front part 10a of the bipartite connector is divided into an array of cells C which accommodate the ferrules at the ends of the fiber optics lines 11. Thus, the ends of these lines which terminate at the connector are exposed and radiate the light signal converged by the lines.

Module M is tailored so as to fit into the bipartite connector so that its back plate 20 which has a window 20W through which pins 10b pass lies against the rear front part 10a of the connector. Behind the back plate 20 of the modules is a mounting panel P having a window W through which pins 10b pass into their sockets in the rear part 10c of the connector.

Thus, to install the module it is fitted on the front part 10a of connector 10, and the pins 10b are then inserted into window W of panel P. Finally, the rear part 10c of the connector is pushed against the rear of panel P so that the pins enter their sockets whereby the connector is now mounted on the panel and radiation from the front end of the connector is blocked by shutter plate 19 of the modules, as shown in FIG. 1.

In the interest of safety, operators of fiber-optics transmission systems would be well advised to fit a safety shutter module on all "live" connectors included in the system, for these modules do not interfere with the normal operation of the system in which the connectors are coupled to adapters or other devices, yet they provide full protection against leakage radiation when a live connector is decoupled.

While there has been shown a preferred embodiment of the invention, it is to be understood that many changes may be made therein without departing from the spirit of the invention.

What is claimed is:

1. A safety shutter module adapted to fit onto a connector terminating a fiber-optical transmission line conveying high intensity light signals which are radiated from a front end of the connector when it is decoupled from an adapter plugged into the connector; said safety shutter module comprising:

A) a cap dimensioned to fit onto the connector and provided with a visor that projects beyond the front end of the connector; and B) a shutter plate hingedly attached to the visor and depending therefrom and being operative to swing from an operative mode vertical position in which the shutter plate blocks radiation of light from the front end of the connector emanating from the fiber-optical transmission line to an inoperative mode horizontal position in which the shutter plate lies horizontally against an undersurface of the visor.

2. A module as set forth in claim 1, in which said connector has a box-like configuration and said cap conforms thereto.

3. A module as set forth in claim 2, in which the module is formed by a top wall that lies on a top surface of the connector, on either side of which are ears that lie against respective sides of the connector.

4. A module as set forth in claim 1, in which said adapter is provided with a transmission line which registers with said line of the connector when plugged therein to feed the signals to a terminal unit.

5. A module as set forth in claim 1, in which the adapter, when plugged into the connector, intercepts the hinged shutter plate and swings it upwardly against said visor.

6. A module as set forth in claim 1, which is injection molded whereby the cap, the visor and the hinged shutter plate, are integrated into a unitary structure.

7. A module as set forth in claim 6, in which the plate is hinged to the cap by living hinges.

8. The safety shutter module as set forth in claim 1 wherein said connector has a block-like front part joinable to a block-like rear part, and the cap of the safety shutter module includes:
   a back plate mounted between the front part and the rear part of the connector, and
   a top wall arranged substantially at right angles to the back plate, said top wall having the shutter plate hingedly attached thereto.

9. The module as in claim 8, in which the front part is joinable to the rear part by pins projecting from the rear part and received in corner sockets in the rear part.

10. The module as set forth in claim 9, in which the front part of the connector is divided into an array of open-ended cells, each of which accommodates the end of a fiber-optics light transmitting line, the shutter plate of the module being parallel to the cells to block radiation from the lines.

11. A safety shutter module adapted to fit onto a connector terminating a fiber-optical transmission line conveying high intensity light signals which are radiated from a front end of the connector when it is decoupled from an adapter plugged into the connector; said module comprising:
   A) a cap dimensioned to fit onto the connector and provided with a visor that projects beyond the front end of the connector, and
   B) a shutter plate hinged to the visor and depending therefrom to block radiation from the connector when it is decoupled;
   said connector being a bipartite connector having a block-life front part joinable to a block-like rear part;
   the cap of the module including:
      a top wall lying on top of the front part, and
      a back plate at right angles to the top wall, the back plate lying against a rear end of the front part and facing a front end of the rear part; and wherein:
         the front part is joinable to the rear part by pins projecting from the front part and received in corner sockets in the rear part.

12. A module as set forth in claim 11, in which the front part of the connector is divided into an array of open-ended cells, each of which accommodates the end of a fiber-optics light transmitting line, the shutter plate of the module being parallel to the cells to block radiation from the lines.

13. A safety shutter module adapted to fit onto a connector terminating a transmission line having multiple optical fibers conveying high intensity light signals which are radiated from a front end of the connector when it is decoupled from an adapter plugged into the connector, said safety shutter module comprising:
   A) a cap dimensioned to fit onto the connector and provided with a visor that projects beyond the front end of the connector; and
   B) a unitary shutter plate hingedly attached to the visor and depending therefrom and being operative to swing from an operative mode vertical position in which the shutter plate blocks radiation of light from the front end of the connector emanating from the optical fibers to an inoperative mode horizontal position in which the shutter plate lies horizontally against an undersurface of the visor.

14. The module as set forth in claim 13, in which said connector has a box-like configuration and said cap conforms thereto.

15. The module as set forth in claim 14, in which the module is formed by a top wall that lies on a top surface of the connector, on either side of which are ears that lie against respective sides of the connector.

16. The module as set forth in claim 13, in which said adapter is provided with a transmission line which registers with said line of the connector when plugged therein to feed the signals to a terminal unit.

17. The module as set forth in claim 13, in which the adapter, when plugged into the connector, intercepts the hinged shutter plate and swings it upwardly against said visor.

18. The module as set forth in claim 13, which is injection molded whereby the cap, the visor and the hinged shutter plate, are integrated into a unitary structure.

19. The module as set forth in claim 18, in which the plate is hinged to the cap by living hinges.

20. The safety shutter module as set forth in claim 13 wherein said connector has a block-like front part joinable to a block-like rear part, and the cap of the safety shutter module includes:
   a back plate mounted between the front part and the rear part of the connector, and
   a top wall arranged substantially at right angles to the back plate, said top wall having the shutter plate hingedly attached thereto.

21. The module as in claim 20, in which the front part is joinable to the rear part by pins projecting from the rear part and received in corner sockets in the rear part.

22. The module as set forth in claim 21, in which the front part of the connector is divided into an array of open-ended cells, each of which accommodates the end of a fiber-optics light transmitting line, the shutter plate of the module being parallel to the cells to block radiation from the lines.

* * * * *